(12) United States Patent
Paul et al.

(10) Patent No.: US 10,872,238 B2
(45) Date of Patent: Dec. 22, 2020

(54) AUGMENTED REALITY SYSTEM TO MAP AND VISUALIZE SENSOR DATA

(71) Applicant: General Electric Company, Schenectady, NY (US)

(72) Inventors: Ratnadeep Paul, Cohoes, NY (US); Radislav Alexandrovich Potyrailo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/153,797

(22) Filed: Oct. 7, 2018

(65) Prior Publication Data

US 2020/0110935 A1 Apr. 9, 2020

(51) Int. Cl.
*G02B 27/01* (2006.01)
*G06F 3/01* (2006.01)
(Continued)

(52) U.S. Cl.
CPC ....... *G06K 9/00671* (2013.01); *G02B 27/017* (2013.01); *G06F 1/163* (2013.01);
(Continued)

(58) Field of Classification Search
CPC . G02B 27/017; G06F 3/04845; G06T 19/006; G06T 2207/30108;
(Continued)

(56) References Cited

U.S. PATENT DOCUMENTS

| 8,364,419 B2 | 1/2013 | Potyrailo et al. |
| 8,717,146 B2 | 5/2014 | Potyrailo et al. |

(Continued)

FOREIGN PATENT DOCUMENTS

| KR | 100997084 B1 | 11/2010 |
| WO | 2017/168415 A1 | 10/2017 |

OTHER PUBLICATIONS

Murvay, Pal-Stefan et al., "A survey on gas leak detection and localization techniques", Journal of Loss Prevention the Process Industries, vol. 25, Issue 6, 2012, DOI: 10.1016/jlp2012.05.010, (pp. 966-973, 8 total pages).

(Continued)

*Primary Examiner* — Jin Cheng Wang
(74) *Attorney, Agent, or Firm* — Buckley, Maschoff & Talwalkar LLC

(57) ABSTRACT

A method and system to receive information from at least one multivariable sensor, each multivariable sensor being deployed in an environment, having internet connectivity to communicate with at least one other device over the internet, and selectively determining at least one attribute of multiple events in its environment; receive an indication of a location of the multivariable sensor; receive an indication of a location of an augmented reality device; determine an alarm based on the received information from the at least one multivariable sensor; determine a location for the alarm and a location of a solution associated with the alarm; and present, in a field of view display on the augmented reality device, a visualization of the determined alarm and at least one of the determined location for the alarm and the determined location for the solution associated with the alarm.

16 Claims, 13 Drawing Sheets

(51) Int. Cl.
| | | |
|---|---|---|
| | *G06K 9/00* | (2006.01) |
| | *G06T 19/00* | (2011.01) |
| | *G06F 3/0484* | (2013.01) |
| | *G08B 25/00* | (2006.01) |
| | *G06F 1/16* | (2006.01) |

(52) U.S. Cl.
  CPC .......... *G06F 3/011* (2013.01); *G06F 3/04845* (2013.01); *G06T 19/006* (2013.01); *G08B 25/00* (2013.01); *G06T 2207/30108* (2013.01)

(58) Field of Classification Search
  CPC ......... G04Q 2209/40; G04Q 2209/845; G04Q 2209/823; G04Q 2209/883; G01N 27/026; G01N 33/0036; G01N 33/004; G01N 33/0073; G06K 9/00671; G05B 2219/32014
  USPC ....................................................... 345/633
  See application file for complete search history.

(56) References Cited

U.S. PATENT DOCUMENTS

| | | | |
|---|---|---|---|
| 8,936,191 | B2 | 1/2015 | Potyrailo et al. |
| 9,052,263 | B2 | 6/2015 | Potyrailo et al. |
| 9,389,260 | B2 | 7/2016 | Potyrailo et al. |
| 9,494,541 | B2 | 11/2016 | Potyrailo et al. |
| 9,580,150 | B2 | 2/2017 | Lee |
| 9,638,653 | B2 | 5/2017 | Potyrailo et al. |
| 9,678,030 | B2 | 6/2017 | Potyrailo et al. |
| 9,852,592 | B2 | 12/2017 | McSheffrey |
| 2008/0012577 | A1* | 1/2008 | Potyrailo ............... G01D 9/005 324/633 |
| 2014/0257862 | A1 | 9/2014 | Billman et al. |
| 2016/0187277 | A1 | 6/2016 | Potyrailo et al. |
| 2016/0328612 | A1* | 11/2016 | Ahn .................. G01N 33/0073 |
| 2016/0343163 | A1* | 11/2016 | Venkatesha ........... G06T 19/006 |
| 2017/0019701 | A1* | 1/2017 | Kim .................... H04N 21/4131 |
| 2017/0138922 | A1* | 5/2017 | Potyrailo ........... G01N 33/2888 |
| 2017/0187541 | A1* | 6/2017 | Sundaresan ............. H04L 67/12 |
| 2018/0080890 | A1* | 3/2018 | Potyrailo ................. H04Q 9/00 |
| 2018/0276969 | A1* | 9/2018 | Obaidi ..................... G08G 9/02 |
| 2018/0286246 | A1* | 10/2018 | Baca .................. G01C 21/3453 |
| 2019/0012895 | A1* | 1/2019 | Myers .................. A61B 5/0022 |
| 2019/0236222 | A1* | 8/2019 | Allen ....................... G06F 3/011 |
| 2020/0074831 | A1* | 3/2020 | Yun ........................... G06T 7/90 |

OTHER PUBLICATIONS

Chengjun, Ding et al., "Development on Gas Leak Detection and Location System Based on Wireless Sensor Networks", 2011 Third International Conference on Measuring Technology and Mechatronics Automation, 2011, DOI: 10.1109/ICMTMA.2011.267, (pp. 1067-1070, 4 total pages).

Cooks et al., "Ambient Mass Spectrometry", Science, vol. 311, Issue: 5767, pp. 1566-1570, 2006, 6 pp.

Potyrailo et al., "Materials and Transducers Toward Selective Wireless Gas Sensing", Chemical Reviews, vol. 111, Issue: 11, pp. 7315-7354, Sep. 7, 2011, 40 pp.

Wolfbeis, "Probes, Sensors, and Labels:Why is Real Progress Slow?", Angewandte Chemie International Edition, vol. 52, Issue: 6, pp. 9864-9865, 2013, 2 pp.

Allen et al.,"Measurements of methane emissions at natural gas production sites in the United States", Proceedings of the National Academy of Sciences of the United States of America, vol. 110, Issue: 44, pp. 17768-17773, Oct. 29, 2013, 8 pp.

Zhang et al.,"Applications of Absorption Spectroscopy Using Quantum Cascade Lasers", Applied Spectroscopy, vol. 68, Issue: 10, pp. 1095-1107, 2014, 13 pp.

McManus et al.,"Recent progress in laser-based trace gas instruments: performance and noise analysis", Applied Physics B, vol. 119, Issue: 1, pp. 203-218, 2015, 16 pp.

Potyrailo, "Multivariable sensors for ubiquitous monitoring of gases in the era of Internet of Things and Industrial Internet", Chemical Reviews, vol. 116, Issue: 19, pp. 11877-11923, Sep. 7, 2016, 47 pp.

Hololens, Retrieved from: https://www.microsoft.com/en-ca/hololens, on Sep. 20, 2018, 4 pp.

UNITY3D, Retrieved from: https://unity3d.com/, on Sep. 20, 2018, 10 pp.

Vuforia, Retrieved from: https://www.vuforia.com/, on Sep. 20, 2018, 4 pp.

"Open Hardware Monitor", Retrieved from: http://openhardwaremonitor.org/ on Nov. 6, 2016, 3 pp.

* cited by examiner

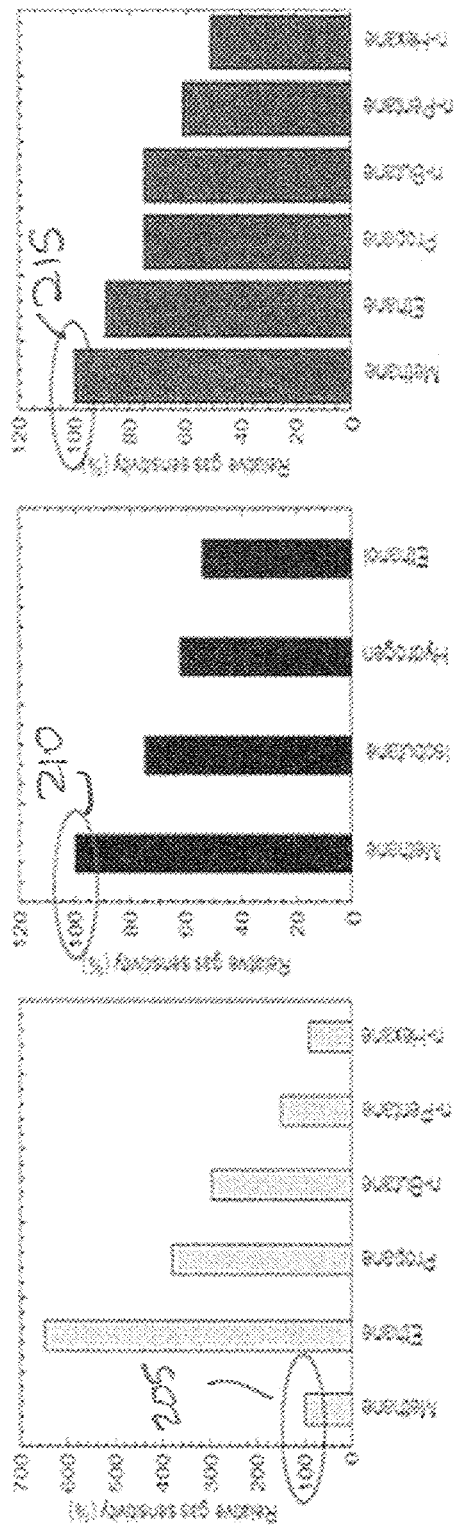

AUGMENTED REALITY SYSTEM TO MAP AND VISUALIZE SENSOR DATA

BACKGROUND

The field of the present disclosure relates generally to an augmented reality system, more particularly, to an augmented reality system integrated with one or more multivariable sensors.

A number of technological advances have been realized regarding environmental sensors. In separate technical areas from environmental sensors, many advances and improvements have been made in the areas of augmented reality (AR). Some of the advances in AR provide mechanisms for a user to partake enhanced, immersive, and interactive experiences with their environment. A number of such experiences focus on entertainment aspects and outcomes.

In some respects, a need exists for methods and systems that provide an integration of AR systems and devices and environmental sensors such that an efficient, reliable, and responsive platform for determining and mitigating environmental risks and other meaningful applications may be realized.

BRIEF DESCRIPTION OF THE DRAWINGS

FIGS. 2A-2C each illustrates a gas selectivity for various types of sensor;

DETAILED DESCRIPTION

Figure 1A:
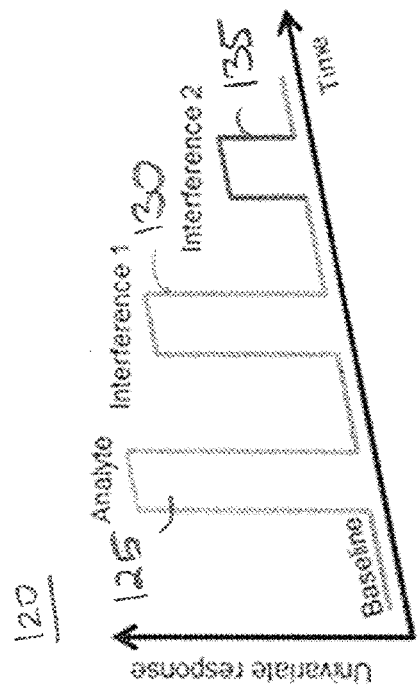
FIGS. 1A and 1B illustrate sensing aspects for different types of sensors embodiments.

Embodying systems and methods herein relate to an Augmented Reality (AR) system that visualizes sensor data in conjunction with actionable information associated with the sensor data simultaneously with a presentation of the locations of the one or more sensors generating the sensor data. In some embodiments, the AR system might display an indication of potential risks and/or other information related to the sensor data. In some embodiments, the AR device may display actions and/or corrective procedures in response to the sensor data of the one or more sensors.

In some aspects, the present disclosure relates to an AR system integrated with one or more sensors. The one or more sensors may each include a multivariable sensor, capable of detecting more than one variable attribute in its environment. In some instances, a multivariable sensor herein might be configured to detect an environmental hazard or condition. The environmental hazard or condition may be a high temperature/fire condition, a gas presence, a high voltage/live wire condition, and other hazards and conditions. In some instances, a multivariable sensor herein might be configured to detect a state of an industrial asset. A nonlimiting example of the state of an industrial asset is the health of lubricating oil in an engine or in a gearbox, and an isolating oil in a transformer. A nonlimiting example of an engine is an internal combustion engine of a car, truck, marine vessel, locomotive. A nonlimiting example of a gearbox is a wind turbine gearbox.

In some embodiments, a multivariable sensor herein might be a gas-selective multidimensional detector. However, a multivariable sensor herein might detect other "events" other than the presence (or lack thereof) of one or more gasses in an environment occupied by the sensor. In some instances, the multivariable sensor might detect and make distinctions between different temperatures, different electrical conditions, different pressures, different lighting conditions, the presence (or lack thereof) of different entities (e.g., based on acquired images), etc.

Some examples of the present disclosure will be discussed in the context of a system and process including AR device (s) integrated with one or more multivariable sensors embodying a gas-selective multidimensional detector to quantify multiple individual gases and their mixtures, wherein the multivariable sensors might accurately detect gases in the presence of numerous interferences to the detection of gases. In some aspects, each of the gas-selective multidimensional detectors include detector-design criteria including, in some instances, a sensing material with diverse responses to different gases, a multivariable transducer with excitation conditions to provide independent output responses and to recognize these different gas responses, and data analytics to provide multi-analyte quantitation and rejection of interferences. Design criteria of some of these sensors may include a sensing material with multi-response mechanisms to different gases and a multivariable transducer with independent outputs to represent these different gas responses. Sensing materials can be inorganic, organic, polymeric, biological, composite, and formulated sensing materials that can be applicable for multivariable gas sensing because they have different response mechanism to different gases. These sensing materials, when coupled with electrical, optical, and electromechanical transducers designed for operation in a multivariable mode, provide performance capabilities previously unavailable from conventional sensor systems. In some aspects, a sensor herein might quantify individual components in gas mixtures, reject interferences thereto, and offer a more stable response over conventional single-output sensors and arrays thereof.

In some aspects, a sensor herein may require little to no consumables, have relatively low power requirements, be procured for a low cost, and embody unobtrusive form factors suitable for, for example, Industrial Internet and other applications.

In some regards, a performance of sensor(s) herein may be beneficial and improved when compared to classic mature analytical instruments such as gas chromatography, ion mobility, vibrational spectroscopy, and mass spectrometry instruments, particularly in Industrial Internet and some other applications.

Some improvements may include the ability to detect multiple gases similar to the classic mature analytical instruments but with the advantage of smaller power demands and smaller size. These advantages can allow deployments of the multivariable sensors herein in scenarios where deployment of classic mature analytical instruments is prohibitive because of their size, cost, power demands, and frequent maintenance needs.

A multivariable sensor can herein might be designed for detection of liquids and their properties. Such a sensor can include a liquid-selective multidimensional detector that can have a multivariable transducer that provides independent outputs about electromagnetic properties of the liquid and data analytics to provide multi-analyte quantification of the different components of interest in the liquid and rejection of response to interferences in the liquid. Details of such a multivariable sensor for detection of liquids and their properties are described in US Patent Application 20170138876, incorporated herein by reference.

A multivariable sensor may refer to a single sensor capable of producing multiple responses, such as response signals, that are not substantially correlated with each other and where these individual response signals from the multivariable sensor are further analyzed using multivariate analysis tools to construct response patterns of sensor exposure to different analytes at different concentrations. The multiple responses from the sensor may differ by sensor operating frequency, sensor operating wavelength, sensor operating temperature, sensor operating voltage, sensor operating power, sensor operating polarization, or the like.

In one or more embodiments, multivariable and/or multivariate signal transduction is performed on the multiple response signals using multivariate analysis tools to construct a multivariable sensor response. A multivariate analysis can refer to a mathematical procedure that may be used to analyze two or more variables from the sensor response and to provide information at the type of at least one gas from the measured sensor parameters and/or quantitative information about the concentration of at least one gas from the measured sensor parameters. For example, the multivariate analysis tools may include canonical correlation analysis, regression analysis, nonlinear regression analysis, principal components analysis, discriminate function analysis, multidimensional scaling, linear discriminate analysis, logistic regression, neural network analysis, or another tool.

Figure 1B:
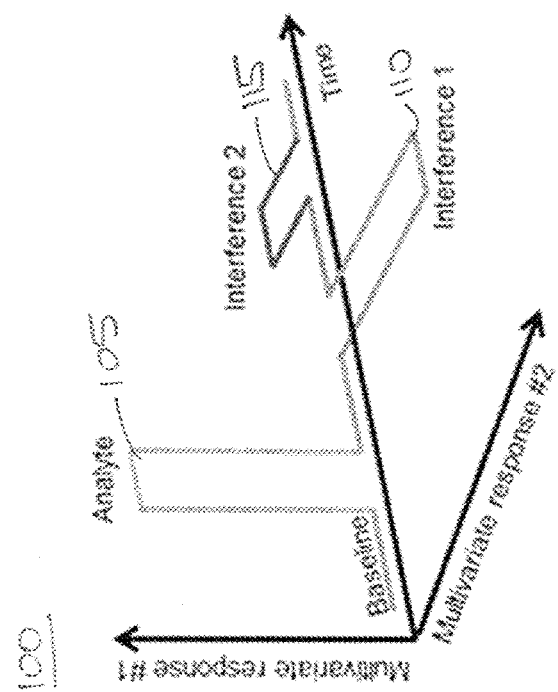

Referring the FIG. 1A, an illustrative graphical plot 100 is shown depicting a sensing concept for some multivariable sensors herein. As shown, the sensing concept(s) of the multivariable sensor allows responses to interferences (e.g., Interference 1 (110), Interference 2 (115)) by a gas-selective multidimensional detector herein. However, the interference responses 110, 115 are in different dimensions or directions than the analyte response 105. This sensing philosophy depicted in FIG. 1A is a major departure from the existing, conventional sensing approach 120 depicted in FIG. 1B, where a conventional sensor cannot differentiate between the analyte 125 and interferences 130, 135 having responses in a same direction.

FIGS. 2A, 2B, and 2C include examples of poor gas selectivity of a conventional non-dispersive infrared sensor, a metal oxide semiconducting sensor, and a catalytic sensor, respectively. A comparison of FIGS. 2A-2C illustrates that conventional single-output sensors do not have a desired minimal gas cross-sensitivity. For example, each of the sensors in FIGS. 2A-2C are calibrated to methane, as shown at 205, 210, and 215. However, they each respond to a large variety of other gasses and are not sufficiently selective to discern details of the multiple different gasses. As such, the conventional sensors referenced in FIGS. 2A-2C might produce too many false alarms to be reliable in a mixed gas (i.e., real world) environment.

In some past systems, gas sensors were used as a part of electronic devices distributed densely or sparsely and might have been combined with a camera. Each gas sensor was non-selectively displaying the response to different gases. FIGS. 2A-2C depict common problems of non-selective response of different conventional sensors that have and display the response to different gases.

Contrary to past, conventional systems, the present disclosure includes methods and systems that, in some embodiments, utilize a single gas sensor operating in its multivariable mode (i.e., a single multivariable sensor) to replace multiple conventional sensors.

In some aspects, gas-selective (or other types of) multidimensional detectors herein may provide improved selectivity of gas (or other event) detection in an unobtrusive format that may have numerous applications, including, for example, installation on mobile unmanned platforms. In some aspects, a multivariable multidimensional sensor herein may exhibit a high selectivity (e.g., to produce no/low false alarms), low cost (e.g., applicable to a disposable implementation), low power consumption (e.g., suitable for ubiquitous installations), a small form factor (e.g., conducive to unobtrusive embedded solutions), and a high sensitivity (e.g., early detection of an alarm situation).

Figure 3:
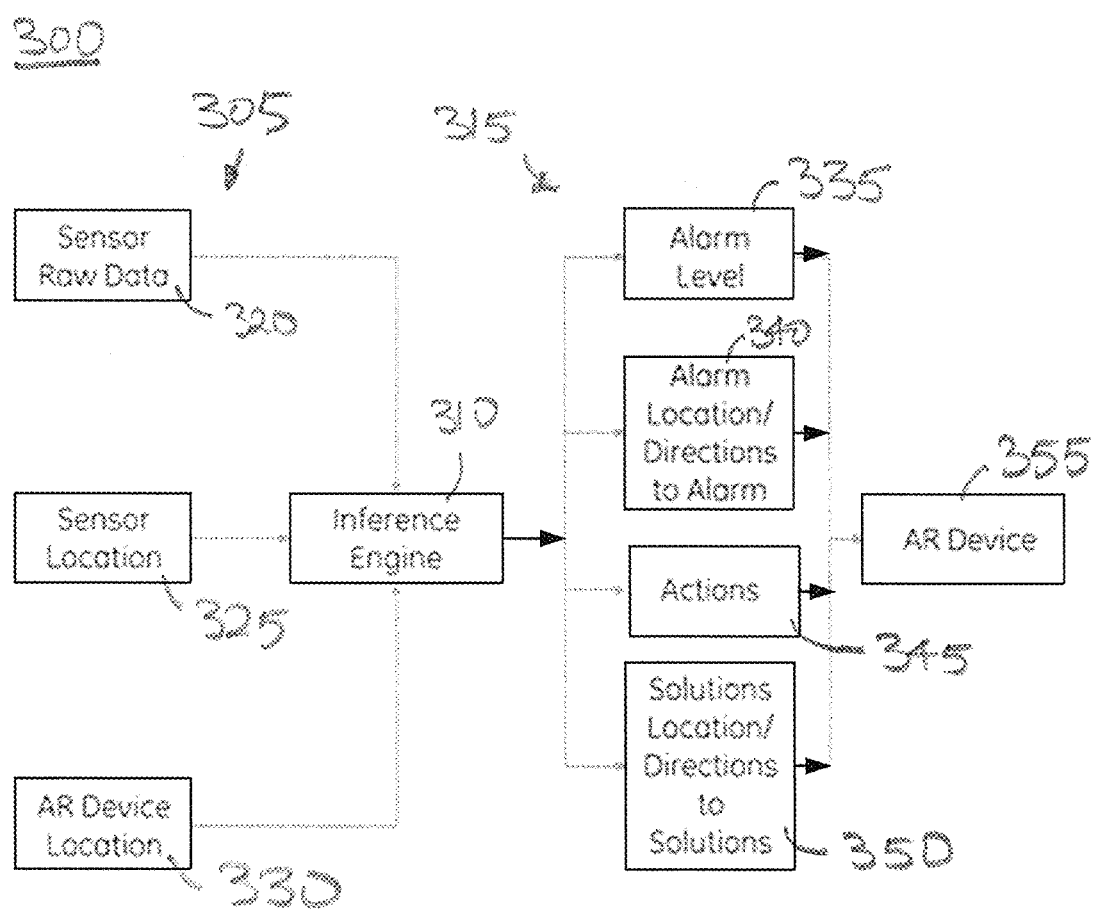
FIG. 3 illustrates an example system architecture or platform, in accordance with some embodiments.

FIG. 3 is an illustrative schematic diagram 300 of an example AR system integrated with environmental sensors, in accordance with some embodiments herein. In some aspects, system 300 includes a number of inputs 305 from one or more multivariable sensors (not shown in FIG. 3) that may be processed by a processor-based inference engine 310 to produce a number of outputs 315 that may be displayed on a AR device 355. In one embodiment, system 300 produces or otherwise generates a visualization of a response of one or more multiple gas-selective multidimensional sensors, where each sensor detects and selectively determines the types and concentrations of different chemicals in the environment occupied by the one or more sensors.

Referring to FIG. 3, system 300 receives three different inputs. In some embodiments, additional types of inputs might be received and processed by system 300. Input 320 is received from one or more multivariable sensors, and includes raw data from, for example, a gas detector/sensor. In some aspects, the data includes identifier(s) to uniquely identify the particular sensor that produced the subject data. Input 325 includes a location of the sensor associated with the raw data received at 320. The sensors may be affixed at a particular location in some embodiments and mobile in some other embodiments. Embodiments of system 300 might include a mixture of fixed location sensors and mobile sensors. In some embodiments, the sensor location data is a three-dimensional (3D) representation (x, y, z) of the sensor's location relative to a fixed coordinate system. The sensor location information 325 may be received directly from the respective sensor(s) associated with the location information. In some aspects, input 330 includes a 3D location (e.g., x, y, z) and orientation (e.g., Euler angles) of an AR device associated (e.g., registered) with system 300, where the location of the AR device is expressed or otherwise represented relative to the same coordinate system as the sensor(s) location at 325. In some aspects, an AR device herein might know its own location (based on one or more techniques/technologies) and location information 330 may be received directly from the AR device 355 associated with location information 330. In contrast to the present disclosure, some prior conventional systems do not include detailed 3D internal position system (IPS) based maps as part of a hazard detection and AR visualization system. The present disclosure includes generating and using a detailed IPS based 3D map of the system that contains the 3D locations of sensors (both static and dynamic) and the AR devices contained embedded within the map. This information, along with the sensor raw data and environmental data, are used to provide actionable feedback to the users using AR devices.

In some aspects, multivariable gas (and other) sensors may include built-in wireless connectivity capabilities to connect and communicate with other devices via the Internet. In some regards, a sensor herein having a functionality to communicate with other devices over the Internet may be referred to as an Internet of Things (IOT) device that may communicate with other devices (e.g., an AR device) over the "cloud", or over a local on-premise server or communicate directly to the AR device.

In some aspects, the inputs 320, 325, and 330 may be transmitted to inference engine 310. In some embodiments, inference engine 310 might include artificial intelligence (AI) aspects, such as machine learning, artificial neural networks, statistical learning, and other techniques. In some aspects, inference engine 310 may use one or more predetermined rules, lookup tables, and other stored data references to process inputs 305 to produce outputs 315. In some instances, inference engine 310 might use a combination of AI aspects and one or more other techniques in processing inputs 305. Operationally, inference engine 310 processes inputs 305 to determine and generate outputs 315. Outputs 315 might include the four outputs shown in FIG. 3, including, for example, an alarm level 335, an alarm location or directions to an alarm 340, an action to take in response to an alarm 345, and a solution location or directions to a solution for an alarm 350. In some embodiments, inference engine 310 may be implemented in a server (not shown in FIG. 3) configured to, for example, receive inputs 305 and deliver or facilitate a cloud-based service including generating outputs 315 that are transmitted or otherwise communicated to AR device 355. The server may include a memory and a processor cooperatively operating to execute program instructions to process inputs 305 to produce outputs 315.

In some embodiments, inference engine 310 (or the functions thereof) may be embodied in AR device 355, where AR device 355 includes sufficient processing power and memory (if needed) to execute the functions disclosed herein as being performed by inference engine 310. That is, in some embodiments, inference engine 310 may be integrated into or at least functionally be performed, at least in part, by AR device 355.

In some embodiments, alarm level 335 can be determined by inference engine 310 based on the location and/or quantity of the detected gas (or other event for other types of sensors) detected by a sensor. The alarm level might not be displayed in terms of raw data numbers indicative of how much gas is leaking and what type of gas is leaking, as detected by a sensor. Rather, in some instances inference engine 310 may use one or more factors, such as, for example, a location of the sensor, an output from neighboring sensors, information about the environment where the gas leak is occurring (e.g., open vs closed, presence of people, the type of gas sensor, etc.) and where the AR device is located (and hence, where a user of the AR device is located) to determine the alarm level output 335 for display on AR device 355. In some instances, an alarm level herein might be expressed or represented by a color code (e.g., red, yellow, and green), text, coded alpha-numerics, a graphical scale such as stars, etc. For example, a detection of a toxic gas in an open field versus detection in a closed environment would lead to different alarm levels and different actionable responses to be deployed on the AR devices. In another example, a detection of an inflammable gas near a thermal/fire source might lead to a higher alarm level as opposed to detection of an inflammable gas without any fire source nearby.

In some aspects, inference engine 310 may produce an indication of an alarm's location 340 (i.e., the location of the sensor that produced the alarm). In some embodiments, an indication of a location for an alarm might include 3D contextual directions to navigate from a current position of the AR device 355 (as indicated by input 330) to the "Alarm Location" (e.g., input 325) where the gas leak (or other event) is detected as occurring. In some embodiments, directions to the location of an alarm might be configured in terms of directional arrows pointing to the specific place or a direction for the AR device 355 user to go to or towards. In some instances, directions to an alarm's location might be configured as a text-based direction, such as, for example, "go to second floor, bay 1", "go to room 1B East", etc.

In some aspects, AR device 355 displays actions 345 produced by inference engine 310, where an action refers to a concrete, actionable solution and/or directive in response to an alarm level 335. Action 345, as well as other outputs 335, 340, and 350 may be provided to AR device 355 for consumption by a user (not shown in FIG. 3) in possession of the AR device. In the example of FIG. 3 including a gas sensor, examples of an action 345 might include, for example, text stating, "Leave the premises immediately", "Turn Valve #XXXX OFF", "Notify the plant manager", and other directives. In some regards, a low level alarm level 335 might cause a first action to be generated by inference engine 310, whereas a second high(er) level alarm level 335 might cause a second action to be generated by inference engine 310. Some actions might be specific to a particular solution location and/or alarm level.

Regarding the solution location or direction to solution output 345, this particular output provides a location of a solution in response to a given alarm level 335. The solution location/direction to the solution might include directions to the solution to address the detected alarm level. In some aspects, the solution location and/or direction to the solution might provide a location of a solution to the detected alarm level and/or directions to the area, locale, switch, valve, control, sensor, etc. to effectuate or invoke a determined solution to an alarm situation in response to the detected alarm level 335. The solution location/direction to the solution 350 may be sent to AR device 355, where the AR device may display the determined solution location and/or directions to the solution(s) 350 on a display of the AR device (e.g., display screen). Solutions in one context herein may refer to any entity or action that may tend to mitigate or resolve a situation indicated by an alarm level 335. Examples of a solution, in some instances herein might include, a user exiting an area, closing a valve, sounding an alarm horn, etc.

In some embodiments, inference engine 310 can be implemented by a remotely located central or distributed server system or integrated with the AR device 355. In some embodiments including a remotely located inference engine, the inputs from a sensor (e.g., raw sensor data 320 and a location of the sensor 325) and the AR device (e.g., a location of the AR device 330) may be communicated wirelessly to a central (or distributed) computing and database server. In this scenario, inference engine 310 calculates the outputs (e.g., 335, 340, 345, and 350) and sends the determined outputs to the AR device 355 where the determined outputs may be displayed in a current, contemporaneous field of vision (FOV) of the user with respect to the AR device. In an embodiment including an inference engine incorporated into an AR device, the inputs from a sensor (e.g., raw sensor data 320 and a location of the sensor 325) may be communicated wirelessly to the AR device 355, where the AR device processes the sensor data and sensor location information with its known location. In this scenario, inference engine 310, as implemented in the AR device, calculates and displays the outputs (e.g., 335, 340, 345, and 350) in a current, contemporaneous FOV of the user with respect to the AR device.

The coordinate system for the AR device and the one or more sensors may be aligned and locked in association with each other using an image marker. In one embodiment, an image marker may be fixed to a known and invariant location in the environment of the sensor(s) and have an asymmetric picture. The image marker may be scanned by or otherwise registered/associated with the AR device, wherein a center location of the image marker may represent the origin of the AR device's coordinate system and wherein the orientation of the image marker determines the orientation of the AR coordinate system. In this manner, the world coordinate system may be aligned with the coordinate system of the AR device (i.e., the AR coordinate system).

In some aspects, the sensors producing the raw data 320 and associated with sensor location 325 may be either fixed to the infrastructure of the sensor's environment or mobile. If the sensors are fixed, their locations may be stored in a database (or other data storage device/system) and their relative locations may be sent to AR device 355 as the user moves AR device 355 in the environment. In the instance the sensors are mobile, then accurate and long-range tracking modalities such as, for example, Ultrawideband (UWB) may be used to locate and track the sensors. As the sensors move in the environment, their location information may be updated via a server onto the AR device and/or via processor(s) onboard the AR device. The AR devices can be located in the air, above ground, underground, above water, underwater, in space, in an industrial setting, a residential setting, environmental setting, military setting, indoor setting, outdoor setting, and other settings.

Figure 4:
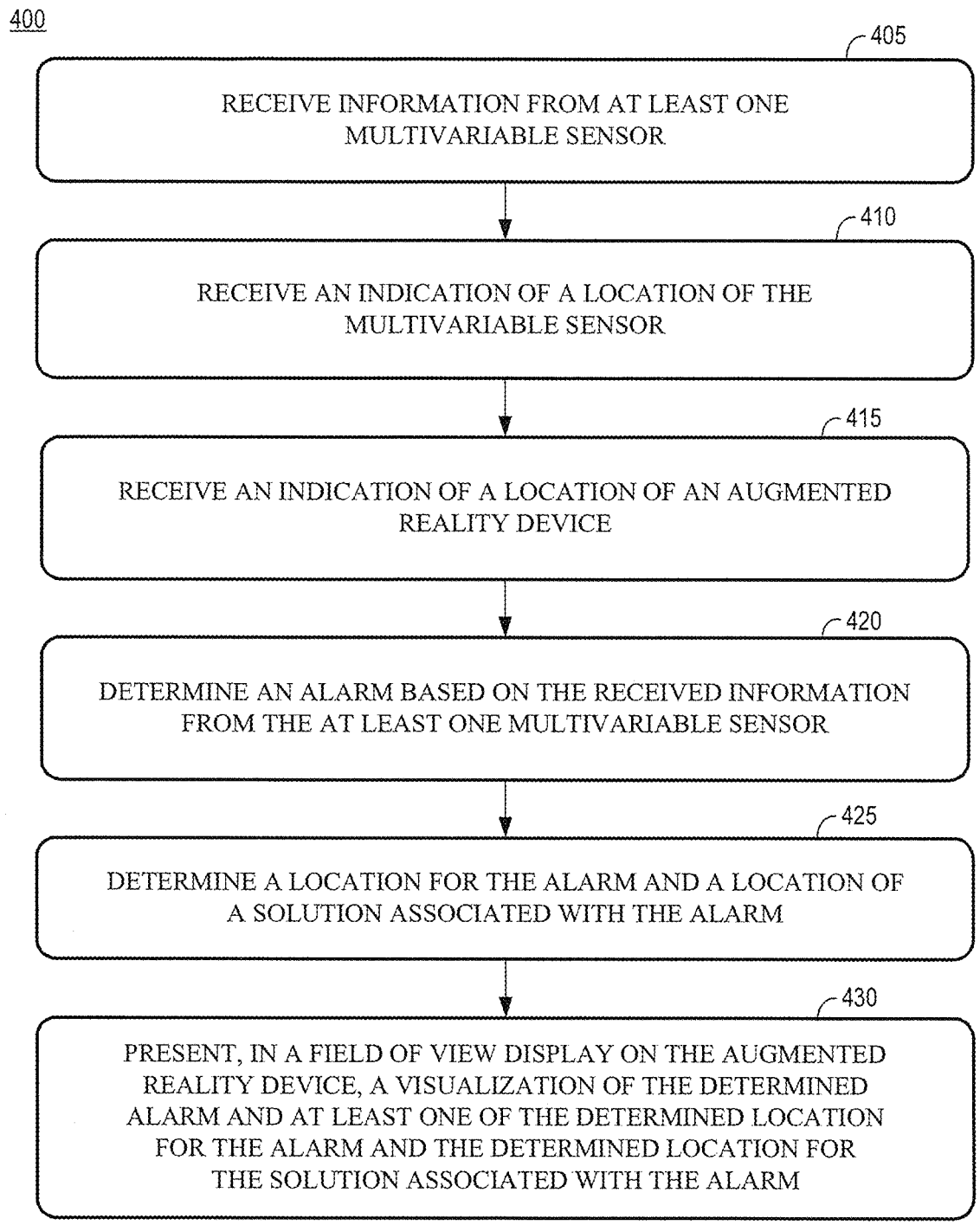
FIG. 4 illustrates a flow diagram for an example process, in accordance with some embodiments.
Figure 5:
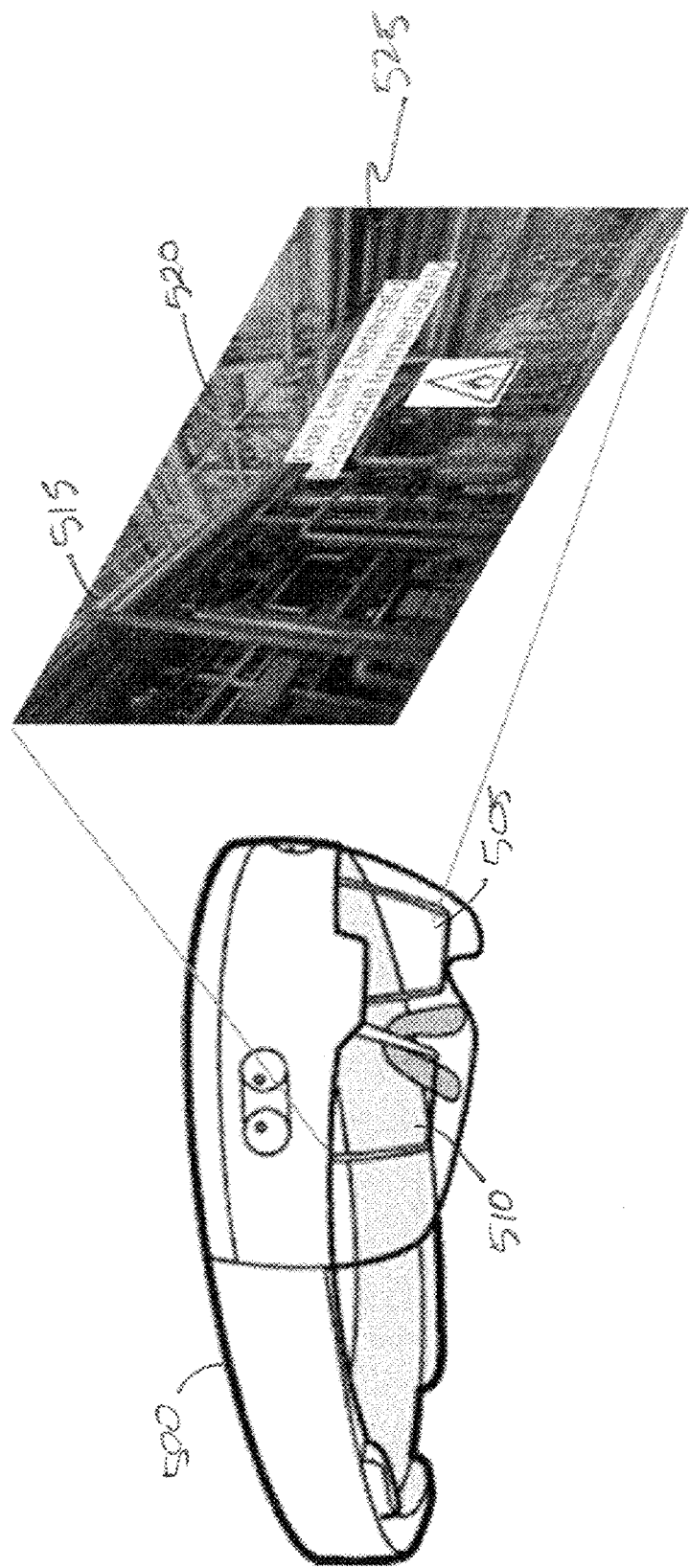
FIG. 5 illustrates an example of augmented reality device system, in accordance with some embodiments.

FIG. 4 is a flow diagram of an example process 400, in some embodiments herein. Process 400 might relate to a system, platform, or architecture as illustrated in, for example, FIG. 3. At operation 405, information from at least one multivariable sensor is received. The information received at 405 may represented the raw data sensed or detected by the at least one multivariable sensor. In one instance, the sensor detects a presence of different gasses and the concentrations of same, where the information received at 405 may include indications of the one or more different gasses detected in the sensor's environment. In the instance the sensor is designed and configured to detect other events (e.g., a high temperature/fire, a temperature of an industrial asset, etc.), then the information received at 405 will relate to these other detected events and may include indications of one or more attributes of the detected other events (e.g., a specific, for example, gas type, gas concentration, concentrations of several gases, liquid type, contaminants in the liquid, temperature, pressure, voltage, lighting condition, etc.) detected by the sensor. The sensor may have internet connectivity to communicate with at least one other device over the internet.

At operation 410, an indication of a location of the multivariable sensor generating the information of operation 405 is received. The location information for a sensor may be determined by one or a combination of techniques, including but not limited to tags or other devices adjacent to, in, or on the sensor where the tag might determine its exact 3D location relative to a device (e.g., image marker) at a known, fixed location defined in a particular coordinate system. The location information for the sensor generating the raw data of operation 405 may be received via a wireless transmission from the respective sensor.

At operation 415, an indication of a location of an AR device associated with or otherwise registered to produce visualization(s) related to the sensor(s) generating the raw data of operation 405 may be received. The location information might include 3D coordinate information with respect to the same coordinate system defining the location of the sensor generating the raw data received of operation 405. In this manner, the location of the sensor and the location of the AR are the same (i.e., aligned with each other).

Proceeding to operation 420, a determination of an alarm is executed. The alarm may be determined based on the sensor information received from the at least one multivariable sensor at operation 405. The particular procedures, routines, and processes to determine the "alarm" may depend on a configuration of the sensor, a desired representation of an alarm indication, a desired or required input for an AR device integrated with the multivariable sensor(s) involved in the execution of process 400, other considerations, and combinations thereof.

At operation 425, a determination of the location of the alarm determined at operation 420 and a location of a solution associated with the determined alarm are made. The determination of the alarm's location may be based on the location of the multivariable sensor associated with or generating the information forming a basis for the alarm.

Continuing to operation 430, a visualization of the determined alarm and at least one of the determined location for the alarm and the determined location for the solution associated with the alarm is presented in a display of the AR device coincident or contemporaneously with a display of a current field of view (FOV) of the AR device. In some embodiments, both the determined location for the alarm and the determined location for the solution associated with the alarm may be presented in the display of the AR device coincident with or contemporaneously with a display of a current FOV of the AR device. For example, at least one of the determined location for the alarm and the determined location for the solution associated with the alarm may be presented as a graphical overlay on a current FOV displayed on the AR device. In some embodiments, an inference engine may receive the stated inputs received at operations 405, 410, and 415 and further perform operations 420 and 425 to produce data and information to have the visualizations of operation 430 presented by an AR device. In some instances, an AR device herein might include or integrate at least some of the function of an inference engine disclosed herein.

FIGS. 5-9 each include example depictions of an AR device, in some different embodiments. For example, FIG. 5 includes an illustrative depiction of an AR device including a visor 500 to be worn about the head of a person/user. Visor 500 includes display lenses/screens 505 and 510 on(to) which visualizations may be projected and/or generated to produce a binocular view visualization 515 that includes a FOV 520 of the user at a current location of the AR device 500 and a graphical representation 525 of an alarm at the location of the alarm within the FOV.

Figure 6:
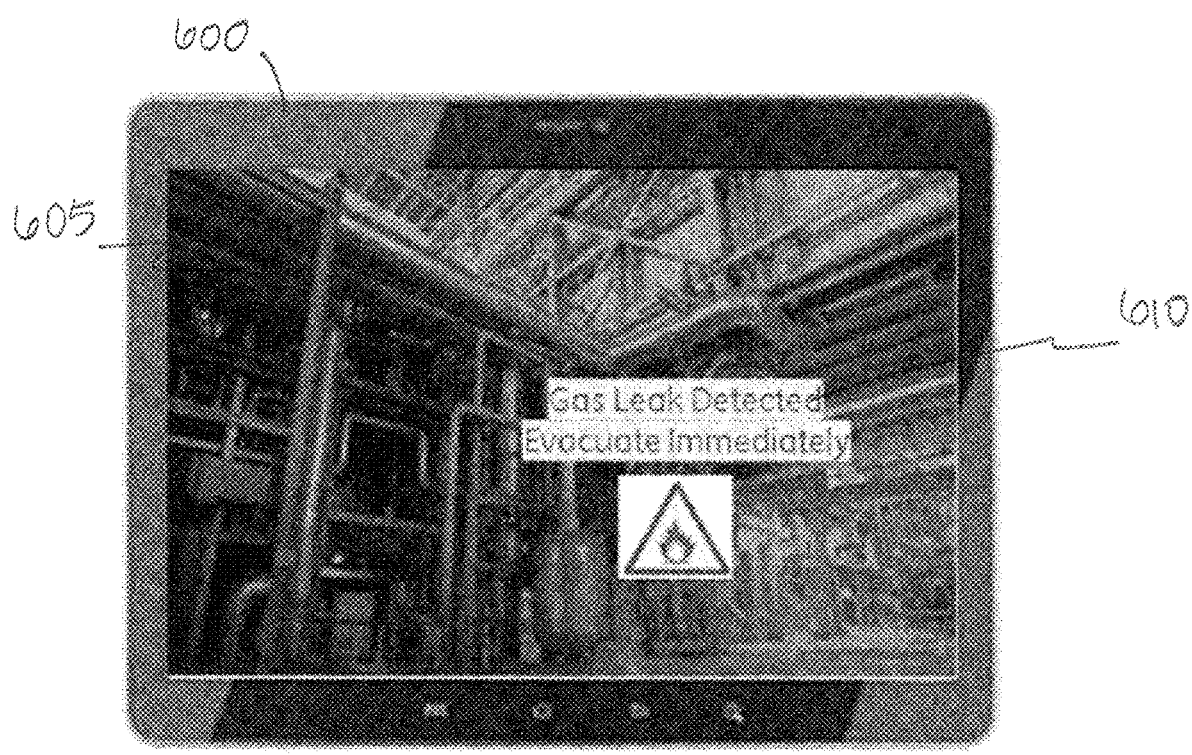
FIG. 6 illustrates another example of augmented reality device system, in accordance with some embodiments.

As another example, FIG. 6 includes an illustrative depiction of an AR device embodying a portable/mobile tablet 600 that might be carried or otherwise transported by a person/user. Tablet 600 includes display on which visualizations may be presented, including a FOV 605 of the user at a current location of the AR device 600 as acquired by one or more cameras on tablet 600 (not shown in FIG. 6) and a graphical representation 610 of an alarm at the location of the alarm within the FOV.

Figure 7:
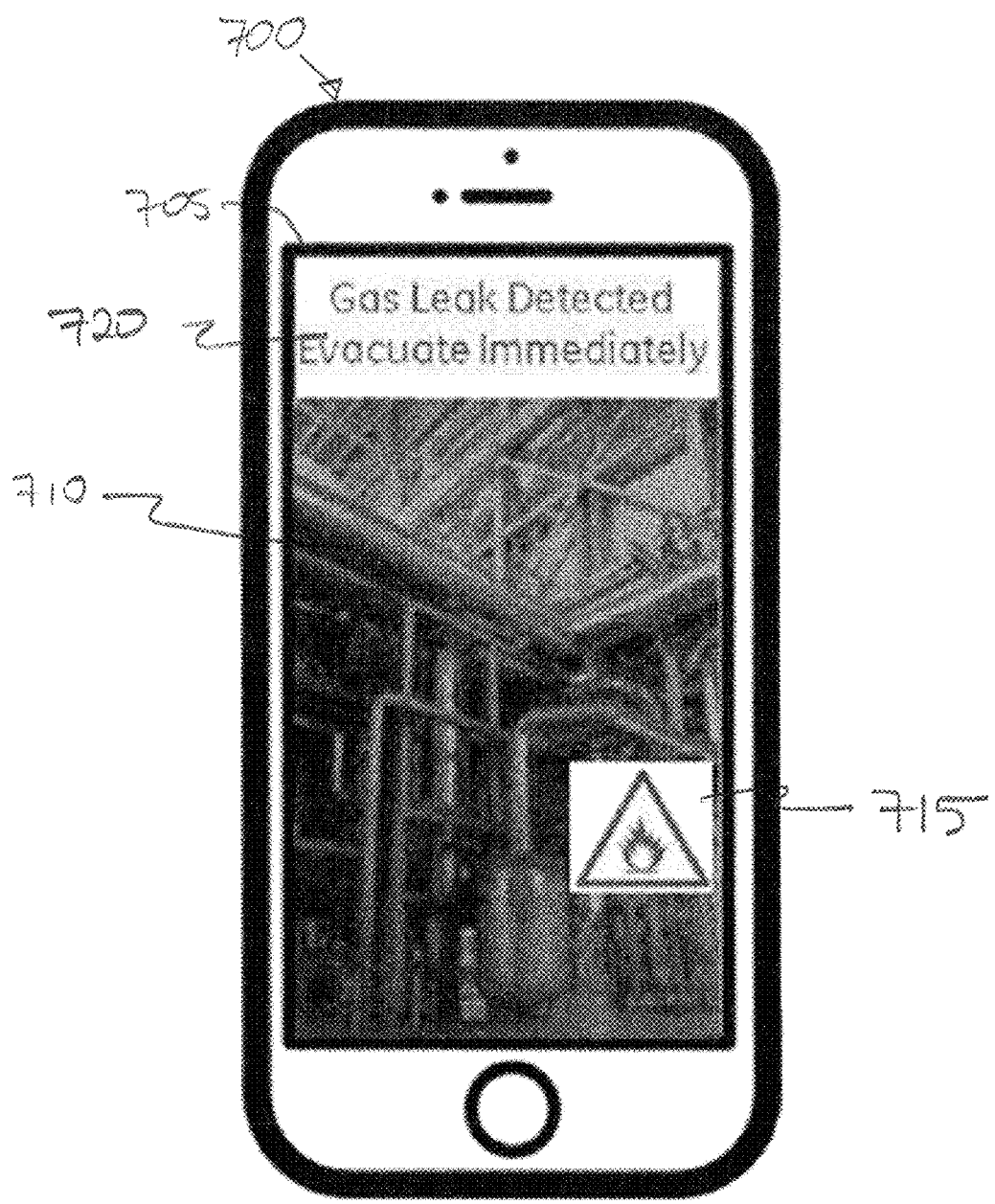
FIG. 7 illustrates yet another example of augmented reality device system, in accordance with some embodiments.

FIG. 7 includes an illustrative depiction of an AR device including a mobile phone 700 that may be carried by a person or user of the mobile phone. Phone 700 includes a display screen 705 in which visualizations may be presented. The visualizations depicted in FIG. 7 include a FOV 710 (generated based on images and/or video acquired by one or more cameras (not shown in FIG. 7) of the mobile phone) at a current location of the phone, a graphical representation 715 of an alarm at the location of the alarm within the FOV, and an action 720 to be performed by the user (i.e., "Evacuate Immediately").

Figure 8:
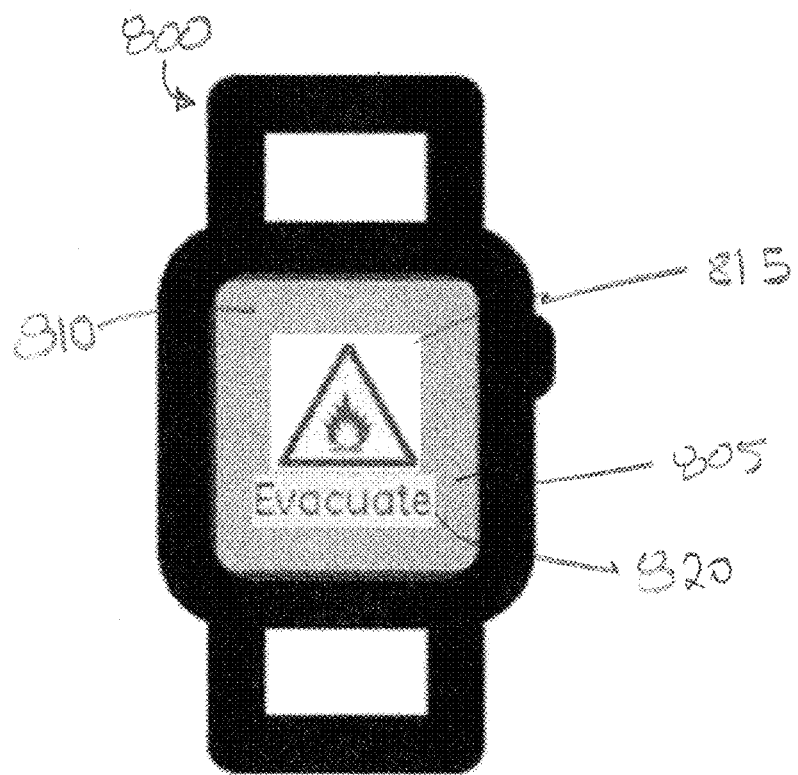
FIG. 8 illustrates an example of augmented reality device system, in accordance with some embodiments.

FIG. 8 includes an illustrative example depiction of an AR device including a "smartwatch" 800 that may be worn by a person or user thereof. Smartwatch 800 includes a display screen 805 in which visualizations may be presented. The visualizations depicted in FIG. 8 include a FOV 810 of the user at a current location of the AR device 700, a graphical representation 815 of an alarm at the location of the alarm within the FOV, and an action 820 to be performed by the user (i.e., "Evacuate"). In some regards, aspects of the visualizations in FIG. 8 may be automatically adjusted based on the size of display screen 805, as compared to other AR device screens. Such adjustments might include a level of detail included in a visualization and/or the manner in which a visualization is effectuated (e.g., static display versus a scrolling display, etc.).

Figure 9:
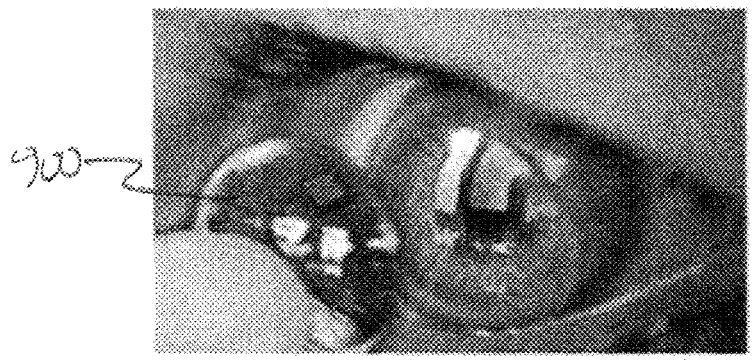
FIG. 9 illustrates still another example of augmented reality device system, in accordance with some embodiments.

FIG. 9 includes an illustrative depiction of an implant-type of AR device, where the example of FIG. 9 is a contact lens that can selectively display visualizations to a wearer thereof. In some embodiments, the visualizations presented in/on contact lens 900 may include one or more of the visualizations types disclosed herein.

Figure 10:
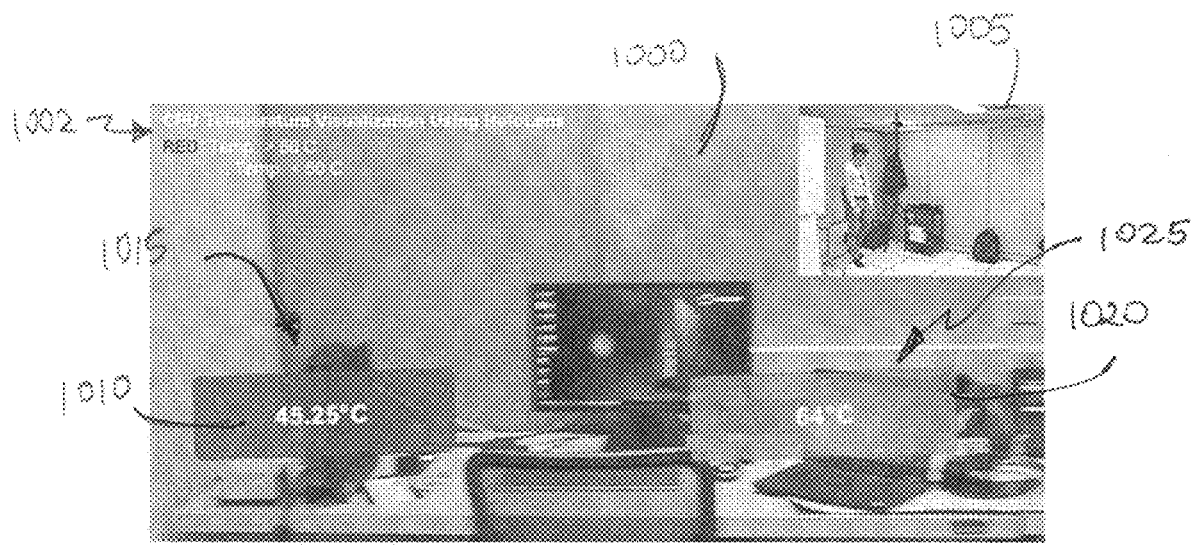
FIG. 10 illustrates an example of a field of view of an augmented reality device system, in accordance with some embodiments.
Figure 11:
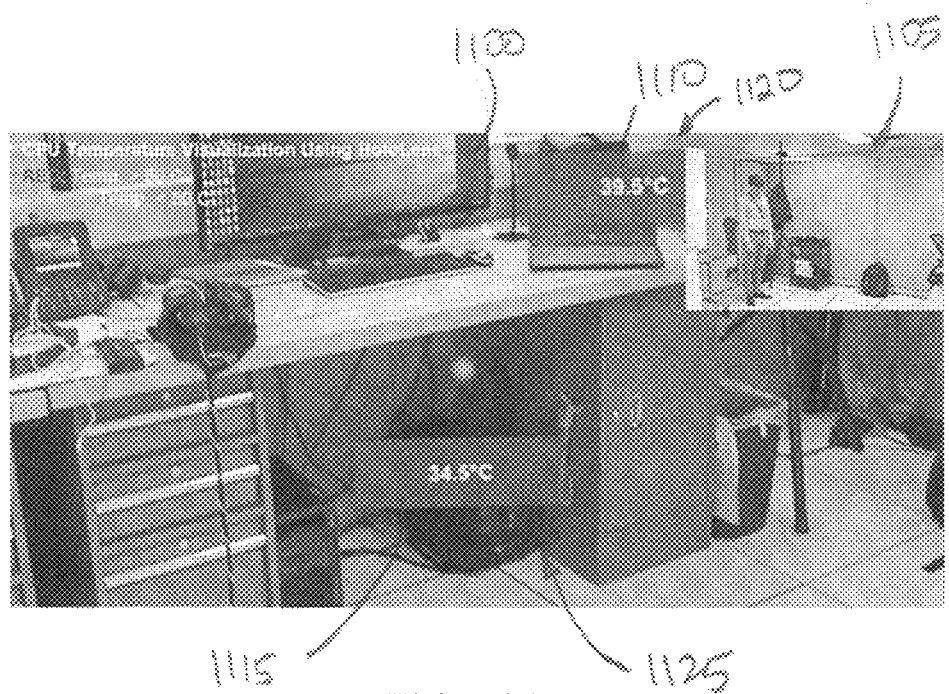
FIG. 11 illustrates an example of a field of view of an augmented reality device system, in accordance with some embodiments.

FIG. 10 is an illustrative example of a FOV 1000 presented on an AR device system in the possession of a user, in accordance with some embodiments. FOV 1000 includes a visualization of the room in which the user wearing the AR device is located. A depiction of the user in the room is shown at 1005 for illustrative purposes and does not form a part of the FOV 1000. FOV 1000 includes temperature attributes 1010 and 1020 displayed at locations 1015 and 1025 of the sensors generating the displayed temperatures, respectively. In the example of FIGS. 10 and 11, the sensors are located within the displayed computing assets, where the temperature sensor in each computing asset operates as a surrogate to an IOT sensor. As shown, the alarms/attribute information is displayed in graphic format on top (i.e., as an overlay) of FOV 1000. FOV 1000 also includes a legend at 1002 that includes a description of the meaning of the items that may be displayed in or on FOV 1000.

FIG. 11 illustrates an example of a field of view of an AR device system, in accordance with some embodiments. FIG. 11 is similar to FIG. 10, although at a different moment in time and the user having changed the orientation of their head (and thus the AR device they are wearing). Thus, FOV 1100 is different than FOV 1000 even though the user is in the same room in FIG. 11 as shown at 1105, as compared to FIG. 10 at 1005. FOV 1100 includes a visualization of the room in which the user wearing the AR device is located. FOV 1100 includes temperature attributes 1110 and 1115 displayed at locations 1120 and 1125, respectively. As shown, the alarms/attribute information is displayed in graphic format overlaid on FOV 1100.

Figure 12:
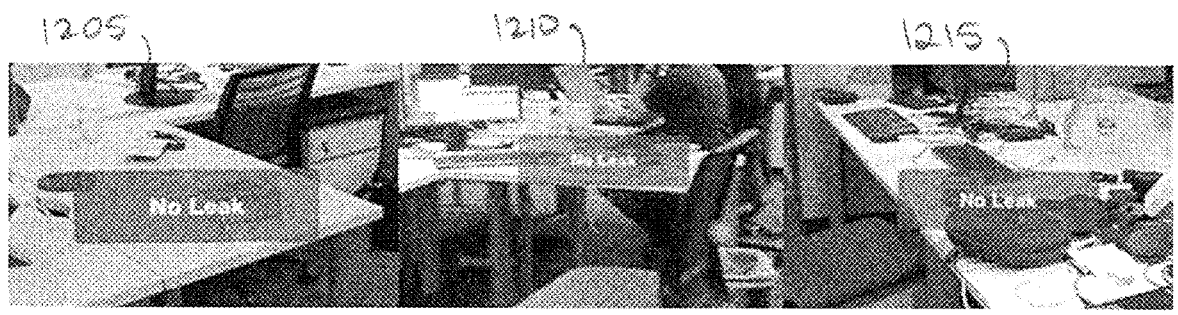
FIG. 12 illustrates an example of a number of fields of view of an augmented reality device system, in accordance with some embodiments.
Figure 13:
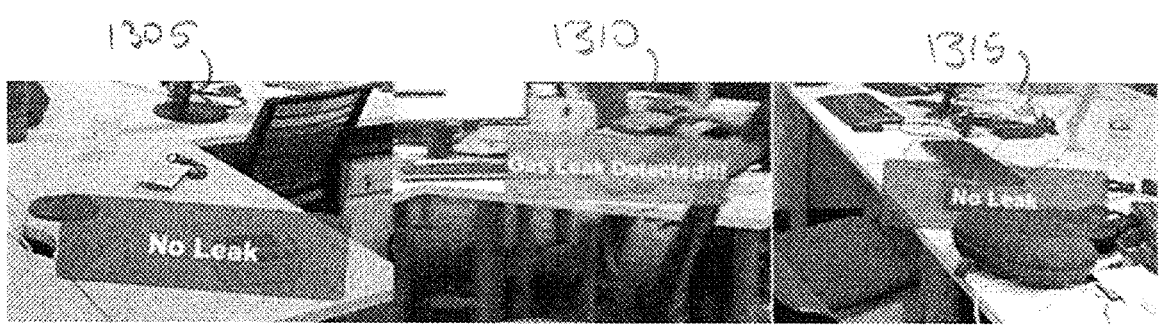
FIG. 13 illustrates an example of a number of fields of view of an augmented reality device system, in accordance with some embodiments.

FIGS. 12 and 13 illustrate an example of FOV of an AR device system, in accordance with some embodiments. In FIG. 12, each FOV 1205, 1210, and 1215 includes an alarm or attribute indicator overlay at the location of a multivariable gas sensor, in accordance with some embodiments herein. As shown, "No Leak" is detected by all of the sensor located within the respective FOV. In FIG. 13, depicting three FOV after a gas leak is detected in an environment, "No Leak" is detected at sensor locations in FOV 1305 and 1315, but a gas leak is detected in POV 1310 (i.e., "Gas Leak Detected!!!"). As demonstrated by FIGS. 12 and 13, the alarms may be presented as visualizations in a display of an AR device in real-time as the information from a sensor is generated and processed for displaying in conjunction with a current AR device FOV display.

Figure 14:
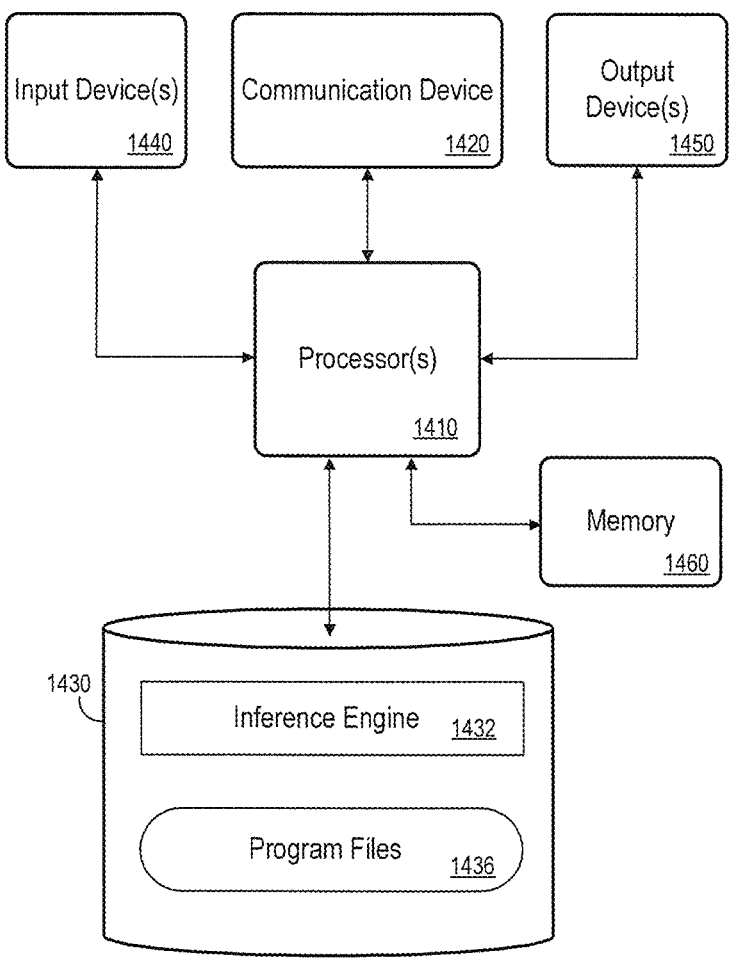
FIG. 14 illustrates a schematic diagram of a system, in accordance with some embodiments.

FIG. 14 is a block diagram of computing system 1400 according to some embodiments. System 1400 may comprise a general-purpose or special-purpose computing apparatus and may execute program code to perform any of the methods, operations, and functions described herein. System 1400 may comprise an implementation of one or more systems (e.g., system 300, an AR device, etc.) and processes (e.g., 400). System 1400 may include other elements that are not shown, according to some embodiments.

System 1400 includes processor(s) 1410 operatively coupled to communication device 1420, data storage device 1430, one or more input devices 1440, one or more output devices 1450, and memory 1460. Communication device 1420 may facilitate communication with external devices, such as a data server and other data sources. Input device(s) 1440 may comprise, for example, a keyboard, a keypad, a mouse or other pointing device, a microphone, knob or a switch, an infrared (IR) port, a docking station, and/or a touch screen. Input device(s) 1440 may be used, for example, to enter information into system 1400. Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, etc., while memory 1460 may comprise Random Access Memory (RAM), Storage Class Memory (SCM) or any other fast-access memory.

Inference engine 1432 may comprise program code executed by processor(s) 1410 (and within the execution engine) to cause system 1400 to perform any one or more of the processes described herein. Embodiments are not limited to execution by a single apparatus. Data storage device 1430 may also store data and other program code 1436 for providing additional functionality and/or which are necessary for operation of system 1400, such as device drivers, operating system files, etc.

An example of operation of a multivariable sensor that can be used in accordance with the present disclosure is depicted in FIGS. 15A-15D. The design criteria of this individual sensor involves a sensing material such as gold nanoparticles functionalized with a 1-mercapto-(triethylene glycol) methyl ether ligand. Such sensing material has multi-response mechanisms to different gases because of its amphiphilic properties that provide the ability to respond to both polar and nonpolar vapors. A multivariable transducer of the present example was used to detect and to recognize these different gas responses was a resonant electrical transducer such as an inductor-capacitor-resistor (LCR) resonant transducer. The resonant sensor response had several outputs that were used to identify and to quantify different gases in mixtures with an interferent gas.

The several outputs of the single multivariable sensor included the magnitude ($Z_p$) of a real part of the resonant impedance spectral response, a resonant frequency ($F_1$), an antiresonant frequency ($F_2$) of an imaginary part of the resonant impedance spectral response, and a zero-reactance frequency ($F_z$) at the imaginary part of the resonant impedance spectral response.

The sensor was exposed to two analyte vapors of interest such as dimethyl methylphosphonate (DMMP) and 1,5-dichloropentane (DCP). The DMMP is known as a nerve agent simulant and DCP is known as a blister agent simulant. These vapors were generated at three concentrations each. These concentrations were 0.04, 0.08, and 0.12 of the partial vapor pressure ($P/P_o$) of these vapors, where P was the generated vapor pressure and $P_o$ was the saturated vapor pressure of these analyte vapors. These concentrations were further denoted in relative units as 1, 2, and 3 relative units of concentrations. During the exposures of the multivariable sensor to these vapors, water vapor was further mixed with these vapors to generate binary mixtures of these vapors with water vapor. The water vapor was at two concentrations such as 0.2 and 0.4 of its partial vapor pressure $P/P_o$. These concentrations of water vapor were further denoted in relative units as 1 and 2 relative units of water concentrations. In addition, the sensor was exposed to DMMP and DCP vapors without mixing with water vapor.

Figures 15A, 15B, 15C, 15D:
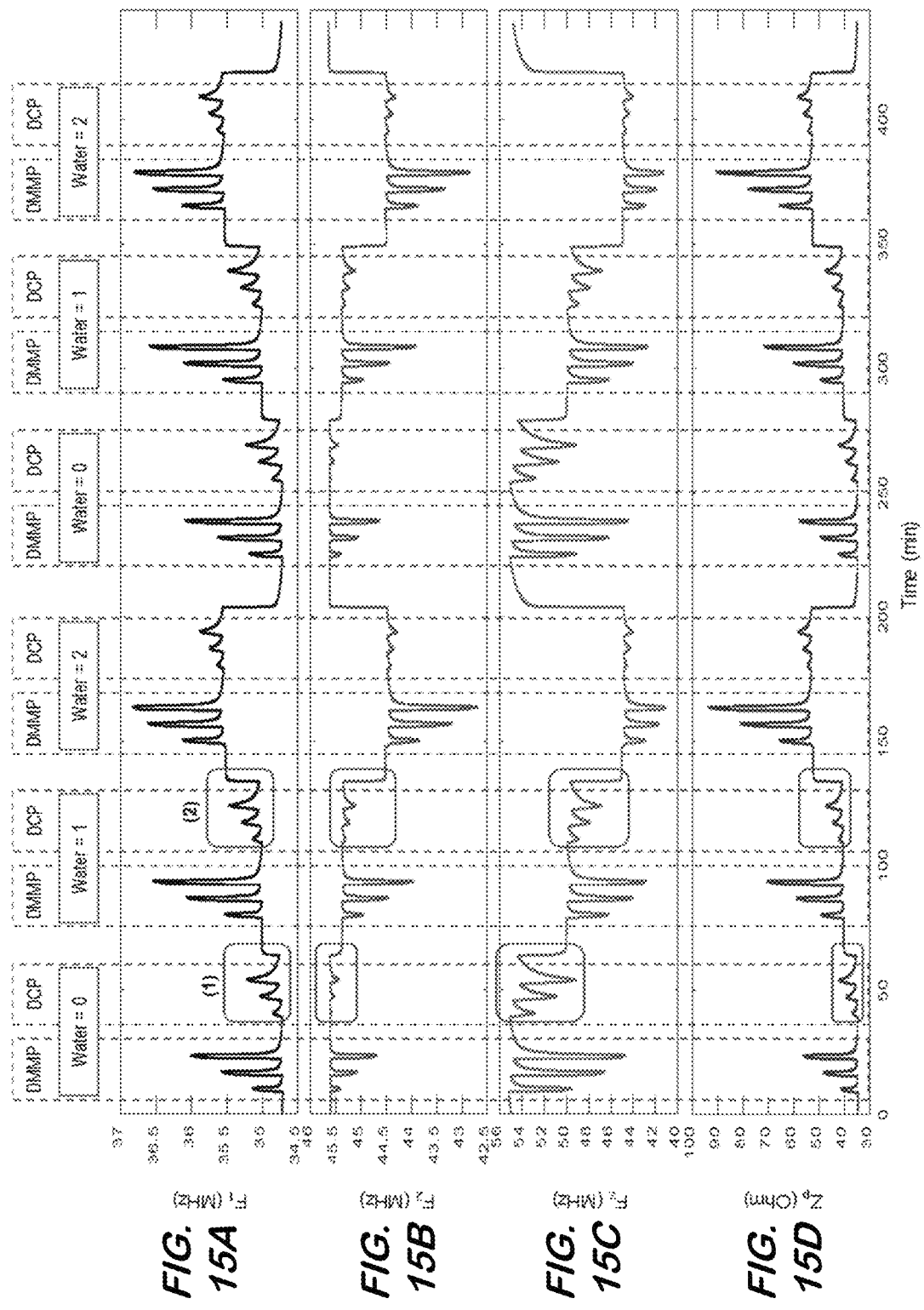
FIGS. 15A-15D illustrate exemplary outputs $F_1$, $F_2$, $F_z$, and $Z_p$ of a multivariable sensor, respectively, in selective detection of two vapors in the presence of an interference such as water vapor at its different concentrations, in accordance with some embodiments.

FIGS. 15A-15D depict $F_1$, $F_2$, $F_z$, and $Z_p$ outputs of a single sensor, respectively. The sensor was exposed to a set of vapors conditions such as three concentrations 1, 2, and 3 of DMMP followed by three concentrations 1, 2, and 3 of DCP without presence of water vapor (water=0), followed by three concentrations 1, 2, and 3 of DMMP followed by three concentrations 1, 2, and 3 of DCP in the presence of water vapor (water=1), followed by three concentrations 1, 2, and 3 of DMMP followed by three concentrations 1, 2, and 3 of DCP in the presence of water vapor (water=2). This set of vapors conditions was further repeated as the second replicate, also depicted in FIG. 15. The different outputs of the single multivariable sensor had distinct diversity that was desired to discriminate and quantify different vapors DMMP and DCP from each other without and with the presence of water vapor. The diversity in outputs of the sensor to different vapors was pronounced in the different relative intensities of the outputs. For example, regions (1) and (2) as labeled in FIG. 15 A and also shown in FIGS. 15B-15D illustrate the relative intensities of the sensor outputs to DCP and to water vapors. The region (1) of the output $F_1$ shows that DCP response at its highest concentration 3 was approximately twice larger than the response to water vapor at its concentration 1. Similarly, the region (2) of the output $F_1$ shows that DCP response at its highest concentration 3 was approximately same when compared to the response to water vapor at its concentration 2. However, these relative responses of DCP and water vapors are very different when inspecting the sensor outputs $F_2$, $F_z$, and $Z_p$.

Figure 16B:
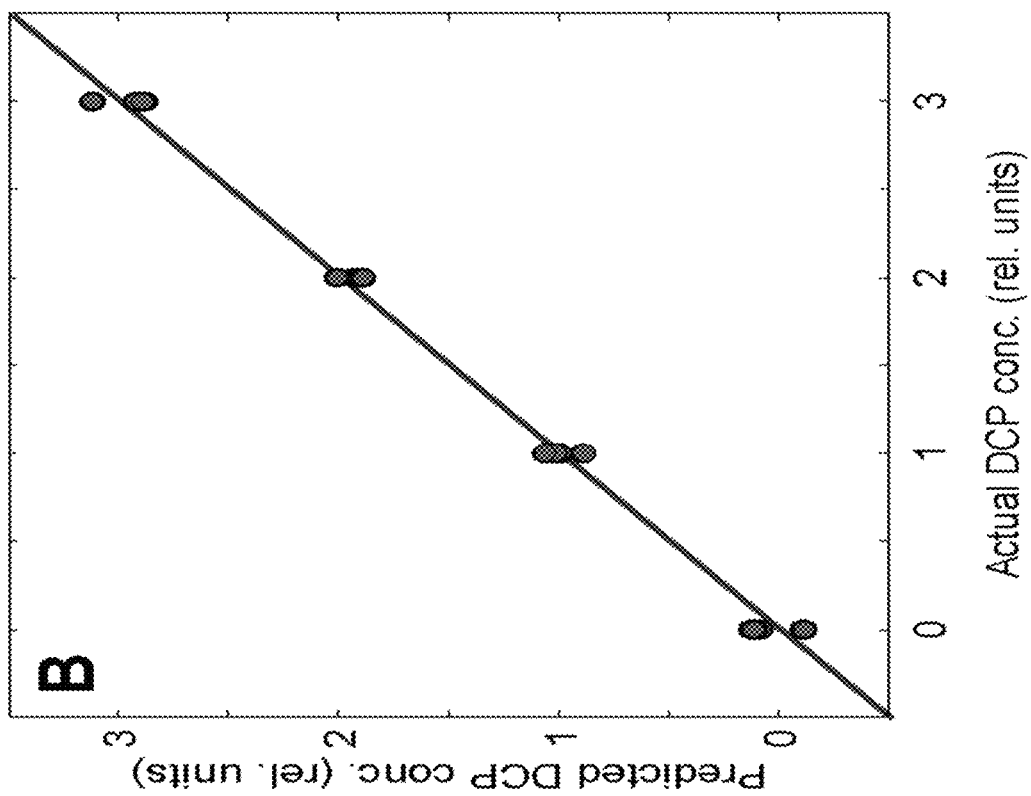
FIGS. 16A and 16B illustrate results of SVM analysis such as correlation plots between the actual and predicted concentrations of DMMP and DCP when the single multivariable sensor was utilized for measurements, in accordance with some embodiments.
Figure 16A:
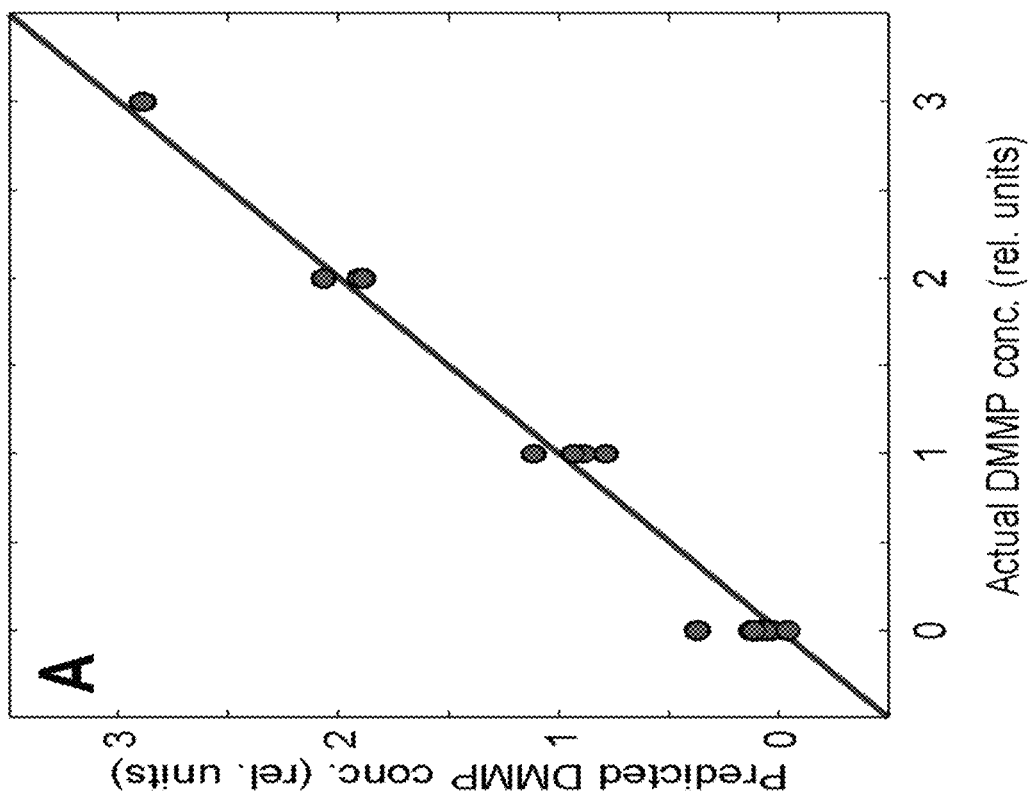

Overall, this diversity in outputs of a single sensor permitted the discrimination and quantitation of DMMP and DCP vapors even in the presence of different concentrations of water vapor. In one embodiment, a processor analyzed outputs from the single sensor using a machine learning algorithm such as Support Vector Machine (SVM) algorithm. FIGS. 16 A and 16B depict correlation plots between the actual and predicted concentrations of DMMP and DCP when the single multivariable sensor was utilized for measurements and the data analysis of the sensor was done using SVM algorithm.

Thus, this resulting sensor that had the sensing material and the transducer designed for operation in a multivariable mode, provided performance capabilities previously unavailable from conventional sensors. In particular, this individual sensor quantified two individual components such as DMMP and DCP in gas mixtures with water vapor such as an interference at different concentrations of water vapor.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of processing multivariable sensor data, sensor location, and AR device location to generate AR device visualization related to same (i.e., process 400, FIG. 4).

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A system comprising:
a memory storing processor-executable instructions; and a processor to execute the processor-executable instructions to cause the system to:
receive information from at least one multivariable sensor, each multivariable sensor being deployed in an environment, having internet connectivity to communicate with at least one other device over the internet, and selectively determining at least two attributes of multiple events in its environment, the selectively determined at least two attributes being included in the received information, each multivariable sensor responsive to the multiple events in a first dimension and interferences to the multiple events in a second dimension and each multivariable sensor including a gas-selective multidimensional detector having:
a sensing material with different responses to different gases;
a multivariable transducer to provide independent outputs and to recognize the different responses to the different gases; and
data analytics to provide multi-analyte quantification of the different responses to the different gases and rejection of interferences to the different gases;
receive an indication of a location of the at least one multivariable sensor;
receive an indication of a location of an augmented reality device;
determine an alarm based on the received information from the at least one multivariable sensor;
determine a location for the alarm based on the location of a specific one of the at least one multivariable sensor and a location of a solution to the determined alarm; and
present, contemporaneously in a current field of view display on the augmented reality device, a visualization of the determined alarm and at least one of the determined location for the alarm and the determined location for the solution to the determined alarm.

2. The system of claim 1, wherein the at least one multivariable sensor includes a liquid-selective multidimensional detector comprising:
a multivariable transducer to provide independent outputs about electromagnetic properties of the liquid; and
data analytics to provide multi-analyte quantification of the different components of interest in the liquid and rejection of response to interferences in the liquid.

3. The system of claim 1, wherein the location of the multivariable sensor and the location of the augmented reality device are referenced with respect to a same coordinate system.

4. The system of claim 1, further comprising presenting, in response to at least the determined alarm and location for the alarm, an actionable solution in the field of view display on the augmented reality device.

5. The system of claim 1, wherein the visualization of the determined alarm and the at least one of the determined location for the alarm and the determined location for the solution to the determined alarm includes at least one of:
a directional arrow,
a textual description of the alarm,
a color-coded indication of an alarm level corresponding to the alarm,
a graphical-coded indication of an alarm level corresponding to the alarm,
a textual description of a direction to the at least one of the determined location for the alarm and the determined location for the solution to the determined alarm from a current location of the augmented reality device,
a textual description of a route to the at least one of the determined location for the alarm and the determined location for the solution to the determined alarm from a current location of the augmented reality device, and
a graphical user interface representation of at least one of the determined alarm and the at least one of the determined location for the alarm and the determined location for the solution to the determined alarm.

6. The system of claim 1, wherein the augmented reality device is one of a headset with a display, visor having a display, an eyewear device having a display, a portable computing device with a display, a wearable device with a display, a device in or on a person, a mobile phone device with a display device, on a manned vehicle, and on an unmanned vehicle.

7. The system of claim 1, wherein the field of view, the visualization of the determined alarm, and the at least one of the determined location for the alarm and the determined location for the solution to the alarm determined displayed on the augmented reality device are current contemporaneous versions thereof.

8. The system of claim 1, wherein the augmented reality device is collocated with one of a person and an unmanned mobile device.

9. A method comprising:
receiving information from at least one multivariable sensor, each multivariable sensor being deployed in an environment, having internet connectivity to communicate with at least one other device over the internet, and selectively determining at least two attributes of multiple events in its environment, the selectively determined at least two attributes being included in the received information, each multivariable sensor responsive to the multiple events in a first dimension and interferences to the multiple events in a second dimension and each multivariable sensor including a gas-selective multidimensional detector having:
a sensing material with different responses to different gases;
a multivariable transducer to provide independent outputs and to recognize the different responses to the different gases; and
data analytics to provide multi-analyte quantification of the different responses to the different gases and rejection of interferences to the different gases;
receiving, by a processor, an indication of a location of the at least one multivariable sensor;
receiving, by the processor, an indication of a location of an augmented reality device;
determining, by the processor, an alarm based on the received information from the at least one multivariable sensor;
determining, by the processor, a location for the alarm based on the location of a specific one of the at least one multivariable sensor and a location of a solution to the determined alarm; and
presenting, contemporaneously in a current field of view display on the augmented reality device, a visualization of the determined alarm and at least one of the determined location for the alarm and the determined location for the solution to the determined alarm.

10. The method of claim 9, wherein the at least one multivariable sensor includes a liquid-selective multidimensional detector comprising:

a multivariable transducer to provide independent outputs about electromagnetic properties of the liquid; and data analytics to provide multi-analyte quantification of the different components of interest in the liquid and rejection of response to interferences in the liquid.

11. The method of claim 9, wherein the location of the multivariable sensor and the location of the augmented reality device are referenced with respect to a same coordinate system.

12. The method of claim 9, further comprising presenting, in response to at least the determined alarm and location for the alarm, an actionable solution in the field of view display on the augmented reality device.

13. The method of claim 9, wherein the visualization of the determined alarm and the at least one of the determined location for the alarm and the determined location for the solution to the determined alarm includes at least one of:

a directional arrow, a textual description of the alarm, a color-coded indication of an alarm level corresponding to the alarm, a graphical-coded indication of an alarm level corresponding to the alarm, a textual description of a direction to the at least one of the determined location for the alarm and the determined location for the solution to the determined alarm from a current location of the augmented reality device, a textual description of a route to the at least one of the determined location for the alarm and the determined location for the solution to the determined alarm from a current location of the augmented reality device, and a graphical user interface representation of at least one of the determined alarm and the at least one of the determined location for the alarm and the determined location for the solution to the determined alarm.

14. The method of claim 9, wherein the augmented reality device is one of a headset with a display, visor having a display, an eyewear device having a display, a portable computing device with a display, a wearable device with a display, a device in or on a person, a mobile phone device with a display device, on a manned vehicle, and on an unmanned vehicle.

15. The method of claim 9, wherein the augmented reality device is in air, above ground, underground, above water, underwater, in space, in an industrial setting, a residential setting, environmental setting, military setting, indoor setting, outdoor setting.

16. The method of claim 9, wherein the field of view, the visualization of the determined alarm, and the at least one of the determined location for the alarm and the determined location for the solution to the determined the alarm displayed on the augmented reality device are current contemporaneous versions thereof.

* * * * *